UNITED STATES PATENT OFFICE.

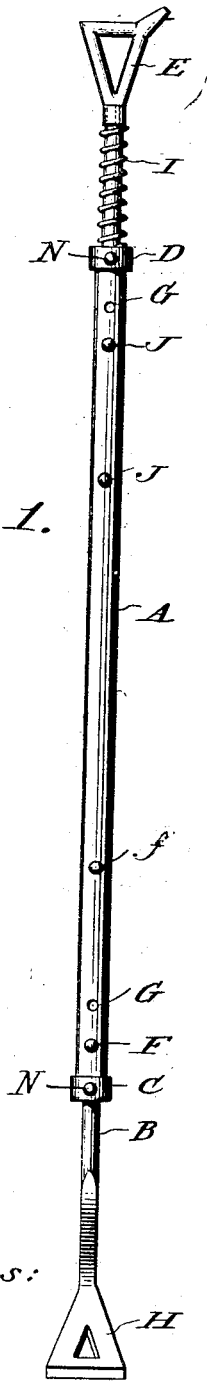
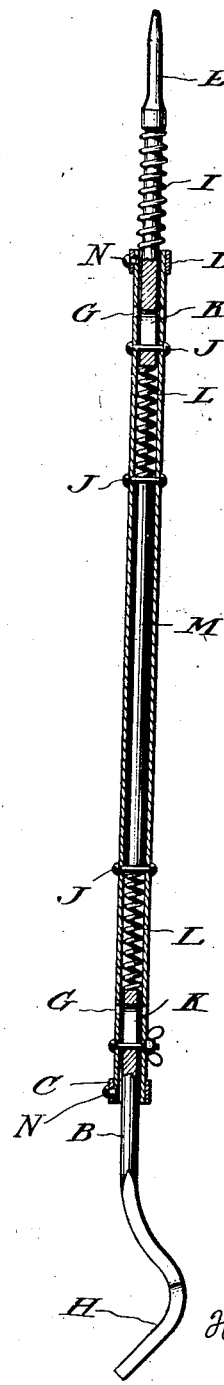

HENRY A. SHERMAN, OF VAN VLECK, TEXAS.

DIRT-TAMPING SHOVEL.

1,033,074.

Specification of Letters Patent.

Patented July 16, 1912.

Application filed April 27, 1912. Serial No. 693,750.

*To all whom it may concern:*

Be it known that I, HENRY A. SHERMAN, a citizen of the United States, residing at Van Vleck, in the county of Matagorda and State of Texas, have invented certain new and useful Improvements in Dirt-Tamping Shovels, (for which I have obtained a patent in the Dominion of Canada, No. 136,001, bearing date October 3, 1911,) of which the following is a specification.

My invention relates to dirt tamping shovels and has for an object to supply a more simple, powerful and effective shovel of its class.

Another object is to improve the parts of the dirt tamping tool to give such tool a different action.

I attain these objects by the mechanism illustrated in the accompanying drawing in which,—

Figure 1 is a front view of the complete device: and Fig. 2 is a longitudinal, sectional view.

Similar letters of reference refer to the same parts throughout the views.

A designates an improved tubular handle having its ends strengthened by supporting caps C and D, and carrying the shovel blade B in one end and the loop handle E in the other end. Both these elements are movable in the handle, such movements being limited by the slots K.

J indicates rivets passing through the handle A as shown.

F indicates thumb bolts passing through the handle A and the slots K.

Coil springs L are attached to bolts J and the ends of the shovel B and handle E, respectively. These springs absorb the shock created in operating the shovel.

G, G represent holes in the handle A for the purpose of inserting metal pins to make the shovel rigid.

M indicates a solid bar of round iron inserted in the handle A for strengthening said handle and said bar is held in place by two of the rivets J, J in the upper end and one rivet J and the end of the shovel B in the lower end of the tubular member A. The lower end of the tamping blade B is shaped as shown at H in Fig. 1 and is pitched as shown in the side view opposite H in Fig. 2.

N, N represent rivets for securing the caps C and D to the ends of the tubular handle A.

Having thus described my invention what I claim and desire to protect by Letters Patent is:—

1. A tamping shovel comprising a tubular body, a stiffening rod secured in the middle portion thereof, a tamping blade secured so as to be axially movable in one end of said body, a handle with a shank similarly secured in the other end of said body, and cushion springs interposed between said stiffening rod and the inner ends of said tamping blade and handle, substantially as set forth.

2. A tamping shovel comprising a tubular body, a stiffening rod secured in the middle portion thereof, a tamping blade having a shank in one end of said body, a handle having a shank in the other end of said body, said shanks being provided with slots and held in place by bolts passing therethrough, and cushion springs interposed between said rod and the end of said shanks, substantially as set forth.

3. A tamping shovel comprising a tubular body, a tamping blade at one end and a handle at the other end thereof, said blade and handle having shanks adapted to move axially within said body against the action of the expansible springs, said handle having a loop and an expansible spring interposed between said loop and the adjacent end of said body, substantially as set forth.

HENRY A. SHERMAN.

Witnesses:
 DEE H. HAYES,
 EDDIE ALLEN.